US012353172B2

(12) United States Patent
Allimann et al.

(10) Patent No.: US 12,353,172 B2
(45) Date of Patent: Jul. 8, 2025

(54) DEVICE FOR FASTENING AND ORIENTING A BACK ON A MIDDLE FOR A TIMEPIECE

(71) Applicant: The Swatch Group Research and Development Ltd, Marin (CH)

(72) Inventors: Joël Allimann, Vallon (CH); Simon Garcin, Salavaux (CH)

(73) Assignee: The Swatch Group Research and Development Ltd, Marin (CH)

( * ) Notice: Subject to any disclaimer, the term of this patent is extended or adjusted under 35 U.S.C. 154(b) by 338 days.

(21) Appl. No.: 17/953,757

(22) Filed: Sep. 27, 2022

(65) Prior Publication Data

US 2023/0176526 A1 Jun. 8, 2023

(30) Foreign Application Priority Data

Dec. 7, 2021 (EP) .................................... 21212694

(51) Int. Cl.
*G04B 37/00* (2006.01)

(52) U.S. Cl.
CPC ................................ *G04B 37/0008* (2013.01)

(58) Field of Classification Search
CPC .... G04B 37/0008; G04B 37/08; G04B 37/11; G04B 37/087; G04B 37/005; G04B 37/0041; G04B 19/283
See application file for complete search history.

(56) References Cited

U.S. PATENT DOCUMENTS

| | | | | |
|---|---|---|---|---|
| 2018/0032034 A1* | 2/2018 | Vuille | .................... | G04B 47/04 |
| 2021/0088974 A1 | 3/2021 | Tschumi | | |
| 2022/0050423 A1* | 2/2022 | Allimann | .............. | G04B 37/11 |

FOREIGN PATENT DOCUMENTS

| | | |
|---|---|---|
| CN | 101258451 A | 9/2008 |
| CN | 205601620 U | 9/2016 |
| CN | 210835631 U | 6/2020 |
| EP | 062 171 A1 | 8/2016 |
| EP | 502 791 A1 | 6/2019 |
| EP | 276 432 B1 | 3/2020 |
| JP | 4-11489 U | 1/1992 |
| JP | 2003-207581 A | 7/2003 |
| JP | 2021-51063 A | 4/2021 |

OTHER PUBLICATIONS

European Search Report for EP 21 21 2694 dated May 11, 2022.

* cited by examiner

*Primary Examiner* — Edwin A. Leon
(74) *Attorney, Agent, or Firm* — Sughrue Mion, PLLC

(57) ABSTRACT

Provided is a device for fastening a back on a middle portion of a watch. The back includes a cover arranged to form a bearing surface with the middle portion and a body arranged to rest in the middle portion. The device includes an indexing ring disposed between the back and the middle portion, and the ring includes at least one lower catch arranged to cooperate with the back and ensure the indexing with the back and an upper catch are arranged to cooperate with the middle portion and ensure the indexing of the back and ring assembly in relation to the middle portion, and the upper catch has a height greater than that of the lower catch, or vice versa.

13 Claims, 2 Drawing Sheets

DEVICE FOR FASTENING AND ORIENTING A BACK ON A MIDDLE FOR A TIMEPIECE

CROSS REFERENCE TO RELATED APPLICATIONS

This application claims priority to European Patent Application No. 21212694.0 filed Dec. 7, 2021.

FIELD OF THE INVENTION

The invention relates to a device and a method for fastening an element of a watch in relation to another with an adjustable angular orientation, and more particularly a fastening device for a watch case including a back the alignment of which may be adjusted in relation to a 12 o'clock-6 o'clock vertical axis.

The invention also relates to a timepiece, particularly a watch, including such a device.

BACKGROUND OF THE INVENTION

The external parts of watches and similar apparatuses are subject to many constraints, in particular water-resistance, robustness, appearance, and must be produced so as to prevent any unintentional dismantling irremediably resulting in an after-sales intervention for exchanging gaskets, cleaning, lubricating, or even repairing.

Some external part or control components must, also, be angularly indexed in relation to one another, for original reference, rest, or actuation position locations, or also for facilitating the reading of indications or of graduations, or for ensuring the continuity of skew surfaces and/or decorations. This angular indexing is often delicate to perform well, in combination with a good tightening of the components and with a perfect water-resistance of the gaskets.

It is known to use an elastic closing element, independent of the organs to be assembled, as in the document CH 423 637 or in the patent CH 447 046. The drawback of the elastic elements proposed in these documents essentially resides in their overall size. It is also known from the document CH 512 769 to use studs made of compressible materials surrounded by crown segments that cooperate with milling arranged at the corners of a square or rectangular case. Such a device can only be used on shaped cases and the elasticity given by an elastomer-type compressible material that is likely to modify significantly during the ageing of the material.

SUMMARY OF THE INVENTION

The invention proposes to produce a water-resistant and secured assembly of external part components with an angular indexing that is easy to adjust.

To this end, the invention relates to a device for fastening a back on a middle according to claim 1.

The invention also relates to a timepiece including such a fastening device.

BRIEF DESCRIPTION OF THE DRAWINGS

Other features and advantages of the invention will become more apparent upon reading the following description of a particular embodiment of the invention, given by way of simple illustrative and non-limiting example, and the appended figures, wherein.

DETAILED DESCRIPTION OF PREFERRED EMBODIMENTS

The invention proposes to produce a water-resistant and secured assembly of external part components with an angular indexing that is easy to perform, and in a guaranteed position, and this with a minimal number of components, and reduced manufacturing costs. In addition, the use of an indexing ring independent of the gasket seal makes it possible to uncouple the functions, the water-resistance function being performed exclusively by the gasket.

Figure 1:
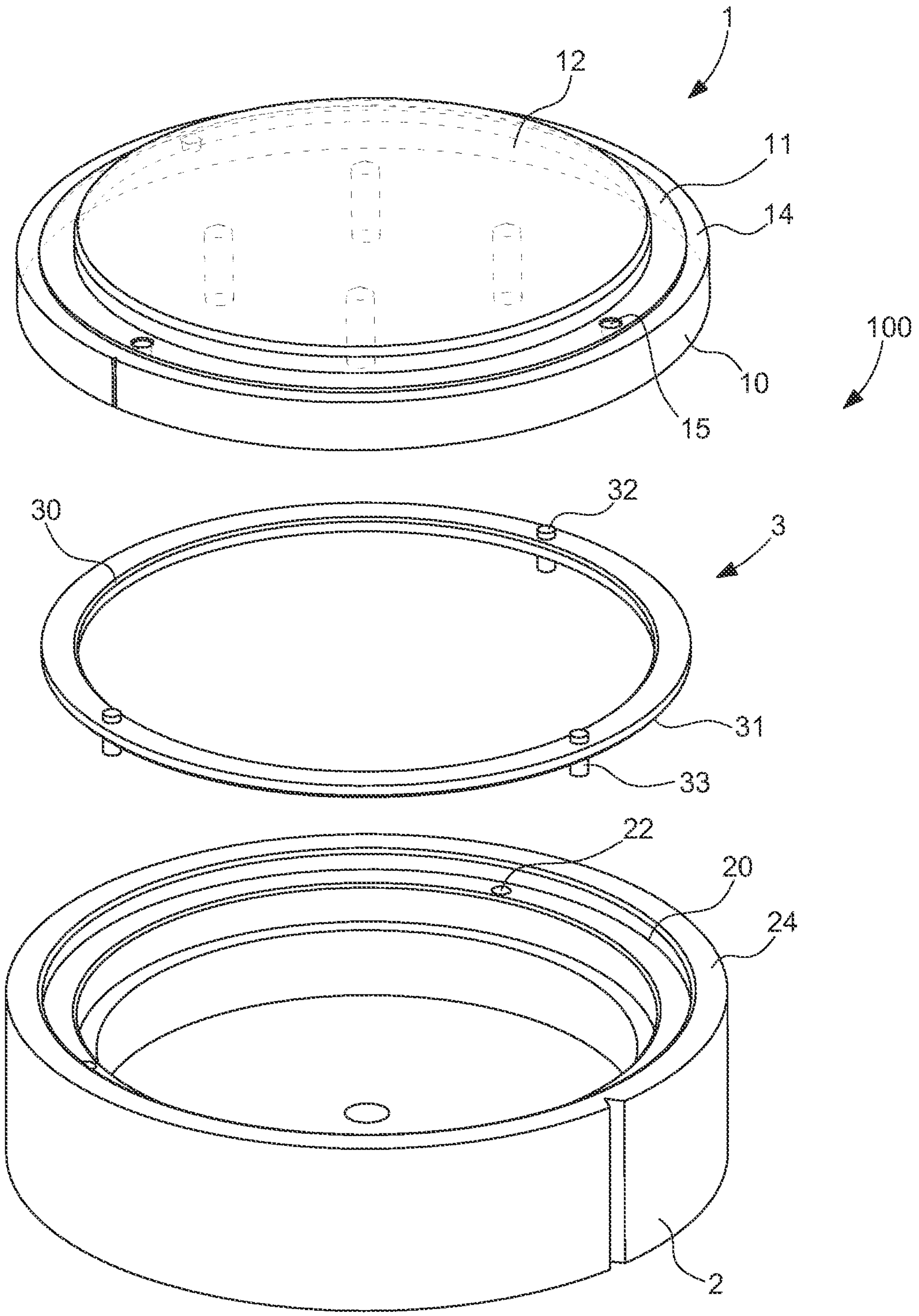
FIG. 1 shows a perspective exploded view of a fastening device with an indexing ring in accordance with the invention, and wherein the back is turned over in relation to its original position.
Figure 2:
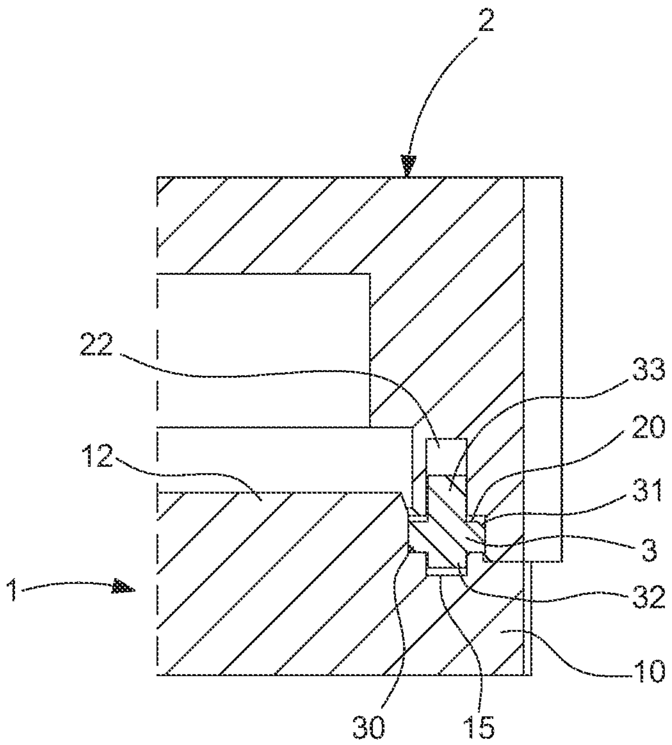
FIG. 2 illustrates a sectional view of a fastening device in accordance with the invention.

FIGS. 1 and 2 illustrate the non-limiting example of the mounting and of the angular indexing of a back in relation to a watch middle.

The invention relates to a device for fastening 100 a back 1 on a middle 2 of a watch, the back 1 comprising a cover 10 arranged to form a bearing surface with the middle 2 and a body 12 arranged to be fitted into the middle 2, said device comprising an indexing ring 3 disposed between the back 1 and the middle 2.

Although other forms are possible for the indexing element 3, a ring will be preferred because it is easy to produce by machining or injection and inexpensive because of very reduced volume.

The cover 10 may be mounted on the middle 2 with a gasket seal interposed between these two elements.

As can be observed in FIGS. 1 and 2, the back 1 has three levels, a first level formed by the cover 10, a second level formed by a first bow 11 with a smaller diameter than the cover 10, and a third level formed by the body 12 of the cover, the body 12 having a smaller diameter than the first bow 11.

The first bow 11 forming the second level is arranged to receive the ring 3. The ring 3 is placed on the cover, against the edge of the body 12 close to the first bow 11 and against a shoulder 20 of the middle 2, and is designed to guarantee the strength and the water-resistance of the assembly proposed between the back 1 and the middle 2, when the surfaces 14 and 24 are in mutual contact in assembled position of the back 1 on the middle 2.

The body 12 of the back 1 forming the third level is arranged to cooperate with the middle 2 of the watch case.

As can be observed in FIGS. 1 and 2, the ring 3 comprises at least one lower catch 32 formed on its lower face of the ring 3 and arranged to rest in a bed or a hole 15 of the second bow of the back 1, the at least one lower catch 32 extending from the lower face of the ring 3. Thus, the ring 3 cannot be rotatably moved when a torque is imparted to the back 1 for example. Advantageously, the ring 3 comprises three lower catches 32 distributed over its lower face and spaced apart from one another according to an angle of 100°. Such a layout enables a good holding of the ring 3 on the back 1, as well as a better distribution of forces during the assembly. The angle of 100° also has the advantage of acting as angular polariser.

The ring 3 also comprises at least one upper catch 33 formed on the upper face of the ring, the upper catch 33 being arranged to cooperate with a machining 22 formed in the middle 2. Such an arrangement enables the correct positioning, or the correct indexing, of the back 1 and ring

3 assembly in relation to the middle 2, which is particularly useful when the back 1 has a decoration and must be perfectly aligned along the 12 h-6 h axis of the watch.

Advantageously, the indexing ring 3 comprises at least one first chamfer 30 on its lower face and at least one second chamfer 31 on its upper face. Upper face means the face that is in contact with the middle 2, and lower face means the face that is in contact with the back 1. The chamfers 30 and 31 make it possible to facilitate the installation of the ring when the back is driven on the middle, the first chamfer 30 being disposed at the shoulder formed by the body 12 and the second bow 11, and the second chamfer 31 being disposed at the middle 2.

The lower catches 32 have a height less than that of the upper catches 33 in such a way as to be able to differentiate the upper face from the lower face and thus place the ring 3 in the right direction. The catches 32, 33 therefore also act as polarisers during the mounting. In addition, as illustrated the catches are disposed opposite on either side of the ring 3. The latter could obviously be offset.

It would also be possible to conceive a ring 3 equipped with chamfers on each of its edges in such a way as to not have to check the direction of mounting of the ring and have catches of the same height.

The height of the body 11 is greater than that of the first bow 12 in such a way as to enable a simple alignment of the back 1 in relation to the middle 2, the body 11 and the ring 3 forming a guiding surface for the middle 2 during the assembly.

It will also be noted in FIG. 1 that the external diameter of the ring 3 corresponds to the internal diameter of the middle 2, which makes it possible to guarantee that the bearing diameter of the ring 3 on the middle 2 is optimal and thus guarantee the water-resistance of the assembly.

The ring 3 is preferably made of polymer material such as hytrel® that is an injectable material and that meets the mechanical requirements for a water-resistance. Obviously, any other material accepting to be elastically deformed, and sufficiently resistant, may be used to produce the ring 3. The ring 3 as well as the lower 32 and upper catches 33 form a one-piece element and thus make it possible to obtain a good resistance against an opening torque of the back 1 (radial opening or releasing). It would also be possible to conceive these catches as attached pins, which could facilitate the shaping of the bow with clearance holes.

The back 1 and the ring 3 are dimensioned such that, when they are forcefully inserted into the middle 2, the back 1 radially presses the ring 3 against said middle 2, which has the effect of compressing the ring between the walls of the middle and of the back. The ring 3, in response to the compressive force, will deform and guarantee good holding of the assembly. The compression of the ring between the back 1 and the middle 2 guarantees the absence of radial clearance between respectively the back 1, the ring 3 and the middle 2, which contributes to the quality (accuracy and rigidity) of the indexing between the back 1 and the middle 2.

FIG. 2 illustrates a sectional view of the back 2 and of the ring 3 assembled on the middle 1, the ring 3 being compressed between the inner lateral face of the middle 2 and the back 1. The forced installation of the back in the middle holds the ring 3 deformed, the deformation obviously being located in the elastic deformation limit of the material of the ring 3.

The invention also relates to a timepiece or watch including such a fastening device.

In sum, the invention makes it possible to obtain a fastening device the design of which is compact, maintain the water-resistance of the watch, and protect against any accidental dismantling.

The invention also makes it possible to ensure an almost perfect orientation (angular positioning tolerance of ±1°) of a component held locked in its operating position.

The invention claimed is:

1. A device for fastening a back (1) on a middle (2) of a watch, the back (1) comprising a cover (10) arranged to form a bearing surface with the middle (2) and a body (12) arranged to rest in the middle, said device comprising an indexing ring (3) disposed between the back and the middle, characterised in that the ring comprises a plurality of lower catches (32) disposed around a periphery of the ring and extending downwardly therefrom and arranged to cooperate with the back and ensure the indexing with the back and a plurality of upper catches (33) disposed around a periphery of the ring and extending upwardly therefrom and arranged to cooperate with the middle (2) and ensure the indexing of the back and ring assembly in relation to the middle (2), said plurality of upper catches (33) having a height greater than that of the plurality of lower catches (32), or the plurality of lower catches having a height greater than that of the plurality of upper catches.

2. The device according to claim 1, wherein the ring (3) comprises three lower catches (32), the lower catches (32) being spaced apart from one another by 100°.

3. The device for according to claim 1, wherein the back (1) comprises a plurality of orifices (15) arranged to receive the plurality of lower catches of the ring (3).

4. The device according to claim 1, wherein the middle (2) comprises a machining (22) arranged to receive the at least one upper catch (33) of the plurality of upper catches of the ring (3).

5. The device according to claim 1, wherein the ring (3) is made of a polymer material.

6. The device according to claim 1, wherein the ring comprises at least one first chamfer (30) on its lower face and at least one second chamfer (31) on its upper face.

7. The device according to claim 1, wherein the back (1) has three levels, a first level formed by the cover (10), a second level formed by a first bow (11) with a smaller diameter than the cover, and a third level formed by the body (12) with a smaller diameter than the first bow.

8. The device according to claim 6, wherein the plurality of upper catches and the plurality of lower catches are disposed opposite on the ring, respectively.

9. The device according to claim 7, wherein the first bow forming the second level is arranged to receive said indexing ring (3).

10. The device according to claim 7, wherein the height of the body (11) is greater than that of the first bow.

11. The device according to claim 1, wherein the external diameter of the ring (3) corresponds to the internal diameter of the middle (2).

12. A timepiece comprising the watch with the fastening and indexing device according to claim 1.

13. The device of claim 1, wherein the ring is one piece and is closed.

* * * * *